United States Patent Office

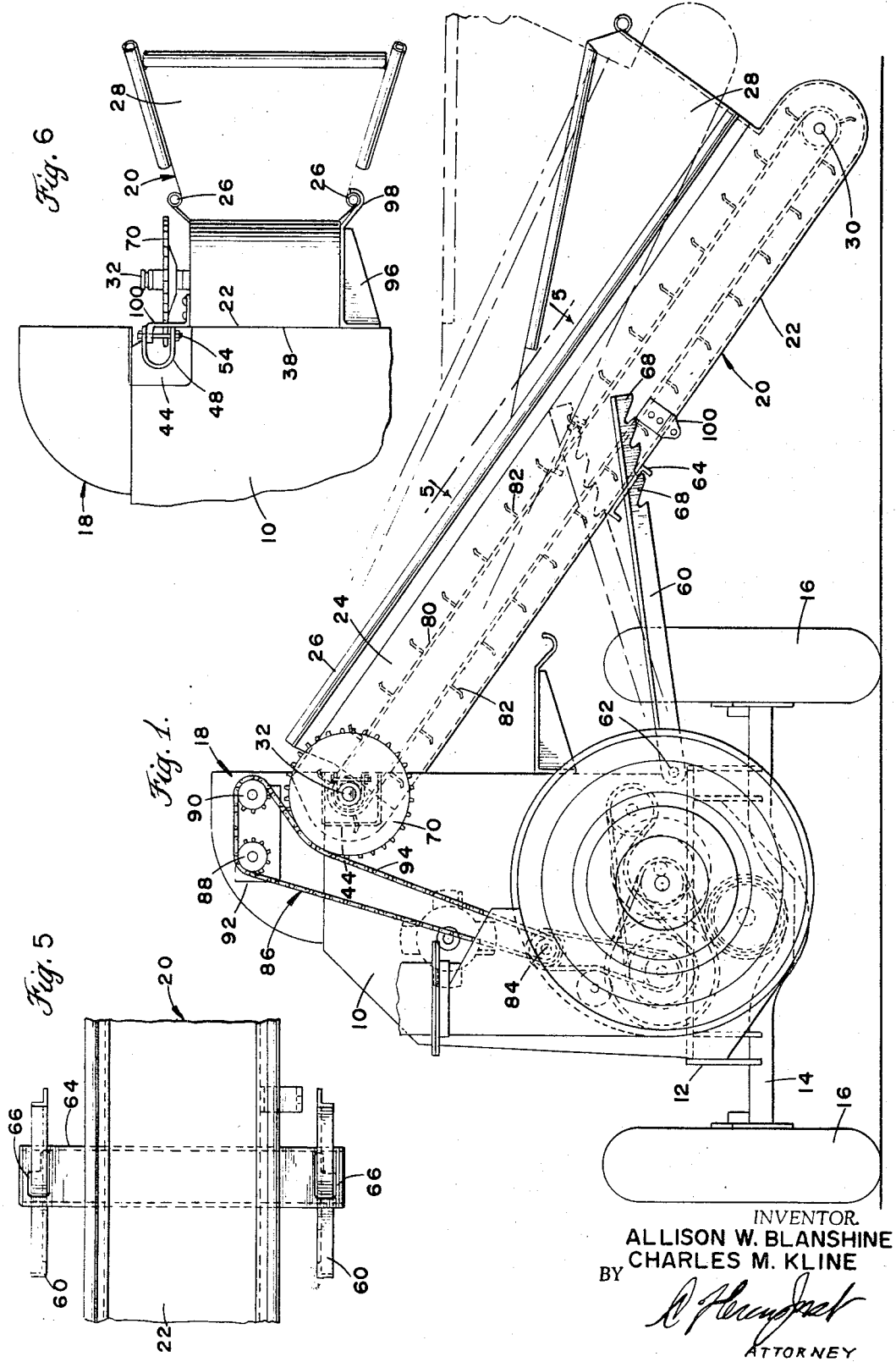

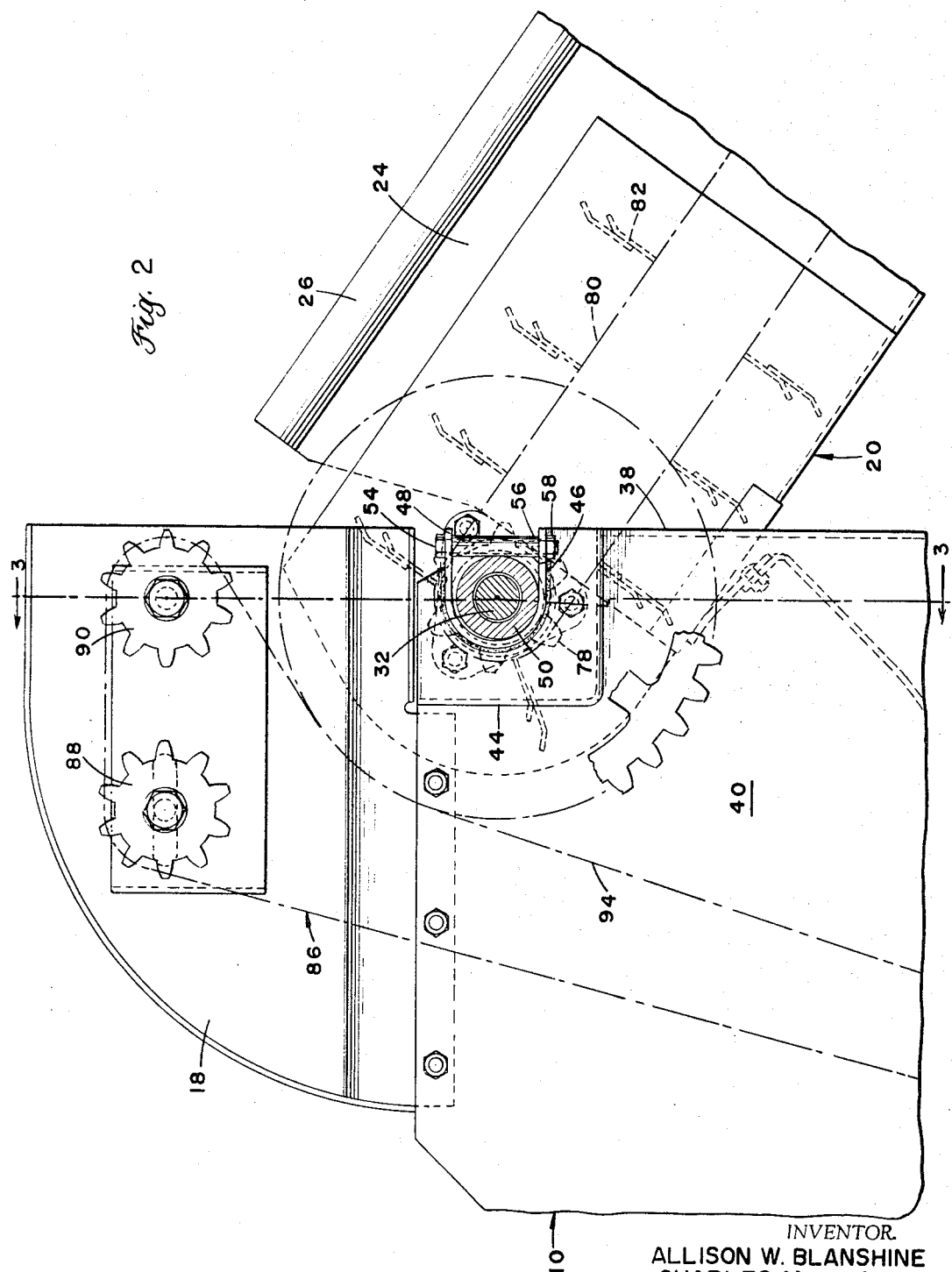

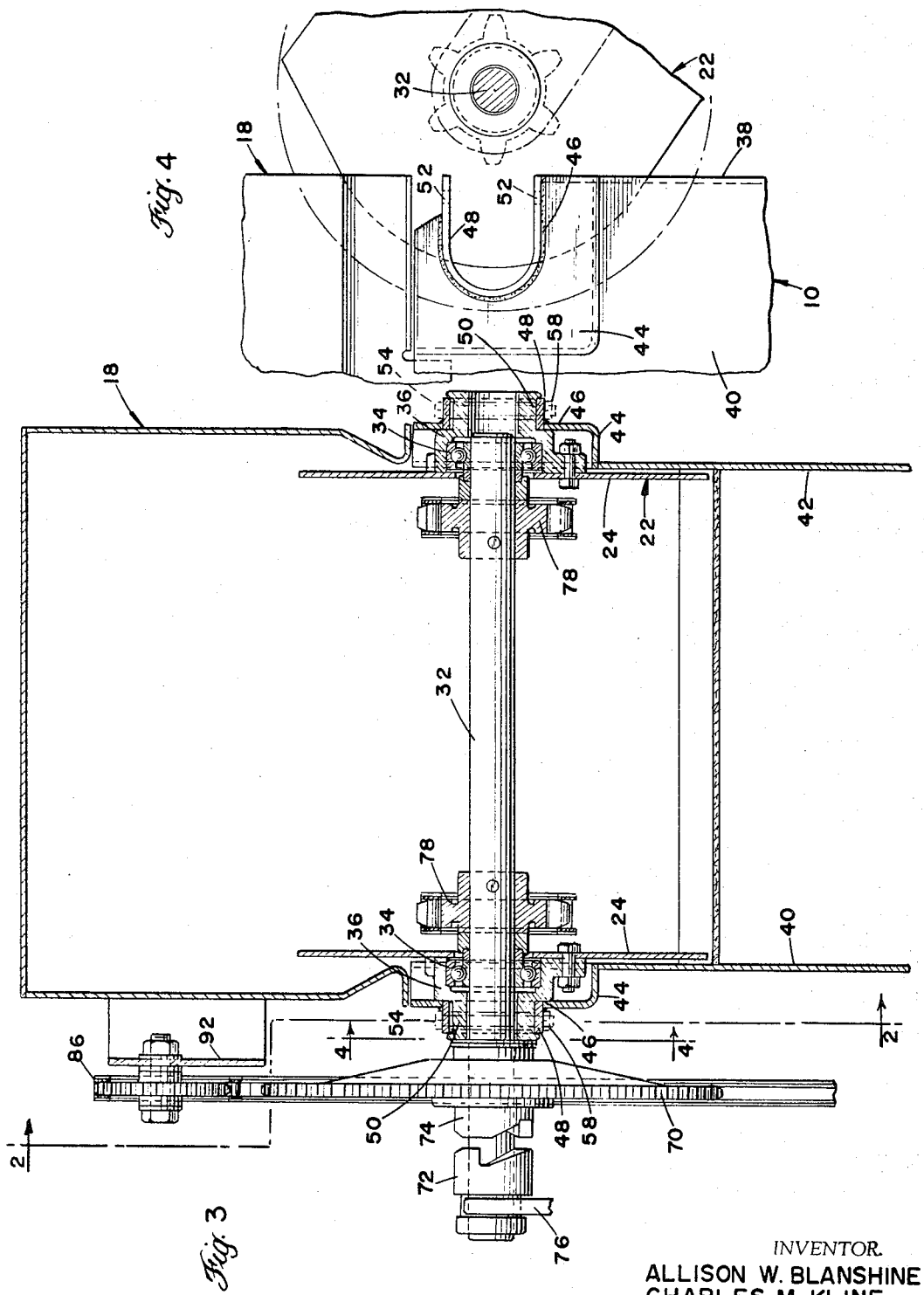

3,342,308
Patented Sept. 19, 1967

3,342,308
CORN PROCESSING MACHINE ELEVATOR UNIT STRUCTURE
Allison W. Blanshine, Lititz, and Charles M. Kline, Reinholds, Pa., assignors to Sperry Rand Corporation, New Holland, Pa., a corporation of Delaware
Filed Aug. 9, 1966, Ser. No. 571,221
4 Claims. (Cl. 198—69)

ABSTRACT OF THE DISCLOSURE

A corn processing machine having a housing provided with an inlet opening in one side wall thereof and an elevator unit removably connectable at one end to said inlet opening of said side wall and extending outwardly and downwardly therefrom to deliver ears of corn thereto, said elevator unit comprising endless flexible elevator means extending around shafts mounted in bearings adjacent the opposite ends of a channel-shaped frame and the uppermost shaft projecting beyond the sides of said channel-shaped frame to be received within horizontal notches opening outward in the outer edges of opposed parallel walls extending transversely to said side walls of said housing at opposite sides of said inlet opening, and removable retaining means extend transversely across the open outer ends of said shaft-receiving notches to retain the delivery end of said elevating unit operatively positioned with respect to said inlet opening and also to connect drive means on said housing with a drive gear on one end of the uppermost shaft to drive said endless elevator means.

---

This invention pertains to a corn processing machine provided with means for receiving ears of corn, shelling the kernels from the ears, shredding the cobs, cracking the kernels of corn, and recombining some or all of the shredded cob material with the cracked corn kernels to comprise cattle food having desirable proportion of nutrient material combined with bulkage. Such overall corn processing system comprises the subject matter of co-pending application, S.N. 546,280, filed April 19, 1966 and owned by the same assignee as the present invention.

The present invention primarily pertains to an elevator unit extending from inlet means in the housing for the overall corn processing machine, said elevator means preferably extending outwardly and downwardly from the inlet means and embodying endless flexible elevator means supported by a channel-like frame comprising chute means operable to feed ears of corn into said inlet means of said corn processing machine.

Although many types of elevator structures have been devised heretofore for use in various kinds of agricultural equipment, it is the principal purpose of the present invention to provide certain details of structure and characteristics in said elevator unit particularly suited for rendering the connection and positioning of the elevator unit upon the corn processing machine especially convenient and efficient.

It is another object of the invention to provide connecting and mounting means by which said elevator unit is associated with the housing of the overall processing machine for movement between an operative position in which the frame of the elevator unit extends transversely with respect to said housing and is disposed outwardly and downwardly from the inlet means thereof, and an inoperative position in which the elevator frame is stowed compactly against one side of said housing as when the entire machine is of the portable type and is being moved from one location to another.

A still further object of the invention is to provide effective bracing means extending from the processing machine and having adjustable engagement with the elevator frame for purposes of disposing the same at different angles with respect to the housing of the processing machine.

Still another object of the invention is to provide appropriate hanger bracket means carried by one side of the housing of the corn processing machine and shaped to be complementary of certain portions of one side of the elevator frame so as to receive the same when said elevator unit is mounted in such stowed, inoperative position and thereby facilitate the mounting of said elevator unit in such inoperative position.

A still further object of the invention is to provide simple but effective means by which the shaft around which the endless flexible elevator means extends at the upper, discharge end of the elevator frame is supported by simple, open ended notch arrangements which receive projecting ends on the bearings for said shaft and also including readily removable bolt means extending across the open ends of said notches and operable to retain said bearing extensions effectively connected within said notches and to the housing of the processing machine adjacent the inlet opening thereof.

A further object ancillary to the foregoing is the provision of powered driving means on the processing machine which is readily engageable by a drive sprocket gear connected to said shaft at the upper discharge end of the elevator, such connection occurring automatically incident to operatively mounting the projecting ends of said bearings within said open ended notches which receive the same, thereby to afford power means for the endless flexible elevator means member as well as providing a very simple but highly efficient means to connect the upper, delivery end of the elevator unit to the inlet means of the housing of said processing machine.

Details of the invention and of said foregoing objects, as well as other objects thereof, are set forth in the following specification and illustrated in the accompanying drawings comprising a part thereof.

In the drawings:

FIG. 1 is an exemplary end elevation of a corn processing machine having an elevator unit attached thereto and extending from the inlet of said machine and embodying the principles of the present invention.

FIG. 2 is an enlarged, fragmentary and partially vertically sectioned upper end of the inlet means of said processing machine and elevating means generally as seen on the line 2—2 of FIG. 3.

FIG. 3 is a fragmentary vertical sectional view of the structure shown in FIG. 2, as seen on the line 3—3 of said figure.

FIG. 4 is a fragmentary vertical elevation, partly in section, of details of the mechanism shown in FIG. 3 as seen on the line 4—4 of said figure.

FIG. 5 is a fragmentary plan view of a portion of the elevator means and supporting bracket means therefor as seen generally on the line 5—5 of FIG. 1.

FIG. 6 is a fragmentary vertical elevation of a portion of one side of the housing of the machine shown in FIG. 1 and illustrating part of the inlet means for said housing and the elevator unit being mounted upon hanger bracket means in inoperative position.

Referring to FIG. 1, a corn processing machine to which the present invention pertains is shown in end elevation therein and is of the portable type. It comprises a housing 10 carried by a frame 12 which, as desired, may be either mounted stationarily, as in a processing shed, or may be of the portable type specifically shown in FIG. 1 in which an axle 14 extends across the frame 12 and is provided at opposite ends with suitable wheels 16.

Various types of corn processing units and mechanisms are contained within the housing 10, details of which are shown particularly in said copending application, Serial No. 546,280, as well as other additional applications directed respectively to particular units of such mechanism and filed subsequently to said aforementioned application. The principal purpose of the present invention is to provide means to feed or deliver ears of corn to the inlet means 18 positioned adjacent one end of the upper portion of housing 10. Said delivery means primarily comprises an elevator unit 20 which, as shown in operative position in FIG. 1, extends preferably at an angle, outwardly and downwardly from the inlet means 18 when the processing machine is to be operated.

In accordance with other principles of the invention, the elevator unit 20 is arranged to be stowed in inoperative position along one side of the housing 10 in fragmentary manner in FIG. 6 for example. The present invention, therefore, primarily concerns detailed characteristics of the elevator unit 20 and particularly the mechanism by which it is variably positionable with respect to the housing 10, both in operative as well as inoperative positions, and the mechanism and means for maintaining the same in said two positions respectively.

The elevator unit 20 primarily comprises a frame 22, having opposite sides 24 which, for example, may be formed from sheet metal of appropriate gauge and terminating at the outer edges thereof in rounded, outwardly projecting flanges 26 which extend longitudinally and add strength and provide safety to the elevator unit. Adjacent the lower end of the elevator unit 20, there also is provided auxiliary chute means 28 comprising somewhat of an extension of the upper ends of the lower portion of the frame 22 and particularly of the sides 24 thereof. Especially as seen in FIG. 6, the opposite sides of the auxiliary chute means 28 flare outwardly so as to provide ready means into which ears of corn may be dumped from suitable vehicles or otherwise for delivery by the elevator unit 20 to the inlet 18 of housing 10.

Extending between the opposite sides 24 of frame 22 of the elevator unit adjacent the upper and lower ends thereof are a pair of shafts 30 and 32. The lower shaft 30, adjacent the normal entrance end of the elevator unit 20 is supported at its opposite ends in conventional bearings, not shown in detail, but preferably of an anti-friction nature and connected to the sides 24 by bolts or the like.

The ends of the uppermost shaft 32 of elevator unit 20, which is positioned at the discharge end of the elevator unit, preferably extend through anti-friction bearings 34 which respectively are received within cup-shaped bearing housing 36, the outer ends of which project a short distance beyond the outer surfaces of the opposite sides 24 of frame 22 of elevator unit 20 as shown to advantage in FIG. 3. Also as illustrated clearly in FIG. 3, the inlet means 18 cooperate with additional inlet opening means which extend downward into the side wall 38 of housing 10 adjacent the upper edge thereof and also adjacent inlet means 18. This additional entrance means also has side walls 40 and 42, fragmentary portions of which are shown in FIG. 3. The side wall 40 actually is part of the front end wall of housing 10.

Connected to the upper portions of the side walls 40 and 42 of the additional inlet means referred to above are outwardly extending shells 44, each of which have outwardly opening notches 46 therein within which clevis-like members 48 are disposed and, preferably, said members 48 are fixed to the rims of the notches 46 by welding, for example, as illustrated in somewhat conventional manner in FIG. 4. The clevis-like members 48 may be formed from strips of suitable steel or the like and the outermost edges thereof project laterally beyond the shells 44 as readily can be seen from FIG. 3.

The opposite legs of the clevis-like members 48 are substantially parallel to each other and the bight portion is semi-circular so as to be complementary to laterally extending, cylindrical extensions 50 on bearing housings 36, the latter being received within said clevis-like members 48 when the elevator unit 20 is connected to housing 10. It thus will be seen that when the extensions 50 of bearing housings 36 respectively are mounted within the clevis-like members 48 at opposite sides of the additional inlet means of the housing 10, the upper, discharge end of the elevator unit 20 is operatively positioned with respect to the inlet means of the housing 10.

To complete such connection, the outer ends of the clevis-like members 48 are provided with vertically aligned holes 52, see FIG. 4, for the reception of retaining bolts 54 which are best shown in FIGS. 2 and 3. In addition to the bolts 54 which directly extend through the holes 52 however, a spacing sleeve 56 preferably is disposed between the upper and lower legs of each clevis-like member 48 for direct engagement with the extension 50 on the bearing housings 36, the bolts 54 extending through said sleeves and such locking assembly being completed by the threading of nuts 58 upon the projecting ends of bolts 54.

When the upper, discharge end of elevator unit 20 thus is connected to the inlet means of housing 10, it will be seen that the outer, lower end of the elevator unit may be moved, pivotally about the axis of uppermost shaft 32 for example, in order to dispose the elevator unit 20 at any desired adjusted angular position with respect to housing 10. By reference to FIG. 1, it will be seen that one exemplary position is illustrated in full lines in FIG. 1, while in broken lines, another exemplary position is shown. The connecting means described above with respect to extensions 50 of bearing housings 36 and clevis-like members 48 is augmented in regard to adjustably positioning the elevator unit at a desired angular arrangement with respect to housing 10 by the use of brace members 60 which, for example, may be in the form of angle iron members attached at the inner ends thereof to housing 10 by connecting means comprising suitable bolts or pins 62, shown in FIG. 1.

As evident from FIG. 5, a pair of the brace members 60 are utilized, respectively adjacent opposite sides of elevator frame 22. The opposite ends of the brace members 60 are provided with adjustable connecting means interengaging the elevator frame 22 intermediately of the ends thereof. Said adjustable connecting means comprise a transverse support member 64 provided, for example, with irregularly shaped openings 66 therein which, as seen in FIG. 5, are complementary to the brace members 60 and through which they project. A series of notches are formed in the vertical webs of the brace members 60 to form longitudinally spaced teeth 68 which are engageable with portions of the openings 66, as can readily be seen from FIGS. 1 and 5, for purposes of securing the elevator unit 20 in any desired angular position within the limits afforded by the number of teeth 68 which are formed on the brace members 60. Gravity serves to maintain the selected teeth 68 in engagement with portions of the openings 66 in support member 64.

Rotatably disposed on one projecting end of the shaft 32 of elevator means 20 is a relatively large drive gear 70, preferably in the form of a sprocket gear. By means of an appropriate clutch member 72, which preferably is keyed longitudinally to shaft 32 for rotation therewith but capable of being moved longitudinally thereon, the clutch member 72 may be moved into engagement with a complementary hub 74 fixed to gear 70 for purposes of drivingly connecting the gear 70 to shaft 32. The clutch member 72 is operated by a conventional shifting member 76.

Fixed to each of the shafts 30 and 32 are pairs of transversely spaced sprocket gears 78. The elevator unit 20 also is provided with endless, flexible elevating means which extends around the shafts 30 and 32 and also around sprocket gears 78. The elevating means actually comprise a pair of sprocket chains 80 which support transversely extending flights 82 preferably substantially as long as the distance between the opposite sides 24 of elevator frame 22. When sprocket gear 70 is connected to driving shaft 32 the flexible elevating means within the channel-like elevator frame 22 will be driven preferably in a direction such that the uppermost flight of the endless elevating means moves upwardly toward the inlet means 18 of housing 10.

The corn processing machine and the mechanism thereof contained within housing 10 includes self-contained power means either directly carried by the processing machine or furnished thereto by some auxiliary means such as the p.t.o. of a tractor for example. Such power means is arranged to drive a shaft 84 shown in exemplary manner in FIG. 1 and having a suitable sprocket gear thereon around which a driving sprocket chain 86 extends. Said chain also preferably extends around a pair of idler sprockets 88 and 90 which are rotatably supported upon a suitable bracket 92 fixed to one end of inlet means 18 for example. As a result, there is a course 90 of sprocket chain 86 extending between idler sprocket 90 and driven sprocket gear 84 which is disposed within the plane of the large sprocket drive gear 70 carried by shaft 32 of the elevator means 20.

When the bearing housing projections 50 on the upper end of the elevator unit 20 are operatively connected to the clevis-like members 48 and are secured therein by retaining bolts 54, the teeth of the large driving sprocket gear 70 automatically mesh with the links of the course 94 of the driving sprocket chain 86 and driving movement of said chain by driving sprocket 84 will be transmitted to large driving sprocket gears 70 of elevator means 20 to operate the flexible, endless elevating means therein. Such driving engagement between the power means of the corn processing machine and the elevator unit 20 therefor is automatic and requires no adjustment in order to complete the power connection.

Particularly when the corn processing machine is of a portable nature and it is desired to move the same from one location to another, it is best practice to disconnect the elevator unit 20 from the operative position thereof shown in FIG. 1 and stow the same in transporting or inoperative position such as shown in exemplary manner in FIG. 6. To accomplish this, it is only necessary to remove the retaining bolts 54 and disengage the toothed outer ends of brace members 60 from the transverse support member 64, thereby completely separating the elevator unit from the processing machine. The elevator unit then may be positioned longitudinally along the side wall 38 of housing 10 as shown in FIG. 6 with the bottom of the channel-like frame 22 disposed in abutting relationship with said side wall.

Suitable hanger bracket means 96 are fixed to said side wall 38 of housing 10 for positioning thereon of one side of the channel-shaped frame 22 of elevator unit 20. The bracket means 96 preferably has an outer extension 98 thereon which is complementary in shape to one of the rounded, outwardly projecting flanges 26 at the normally upper edge of one side of the channel-shaped elevator frame 22 and receives the same as also is shown in FIG. 6 to effect appropriate positioning and retaining of the elevator unit 20 upon the hanger bracket means 96.

To insure against accidental dislodgment of the elevator unit 20 from the hanger bracket means 96, especially when the corn processing machine is in motion, additional locking means comprising a bracket-like locking arm 100, shown in FIGS. 1 and 6, has an outer end provided with a hole positioned to be disposable within one of the clevis-like members 48 for reception of one of the retaining bolts 54 therethrough as also shown in FIG. 6. This completes the securing of the elevator unit 20 in inoperative position upon the housing 10 and thus renders it capable of being moved therewith even while being jostled over uneven ground without accidental dislodgment of said elevating unit from the bracket means 96.

While this invention has been described and illustrated in its several preferred embodiments, it should be understood that the invention is not to be limited to the precise details herein illustrated and described since the same may be carried out in other ways falling within the scope of the invention as claimed.

Having thus described our invention, what we claim is:

1. The combination of a corn processing machine having a housing provided with an inlet opening in one side wall thereof and an elevator unit removably connectable at one end to said inlet opening of said side wall to deliver ears of corn thereto, said elevator unit comprising a channel-shaped frame having substantially parallel opposite sides, shafts extending between said sides adjacent opposite ends of said frame, bearing structures carried by said sides to support the opposite ends of said shafts, said elevator unit being selectively positionable in an operative position in which it extends from its discharge end downwardly and outwardly from said inlet opening in said side wall of said housing and an inoperative position in which it is supported horizontally along said one side wall of said housing for storage therealong, the opposite ends of the shaft adjacent the normally upper discharge end of said frame extending beyond the sides of said elevator frame, flexible endless elevator means having transverse flights thereon and extending around means on said shafts for support and feeding movement of said elevator means within said frame, said inlet opening means in said housing having opposed parallel walls extending transversely to said one side wall of said housing, each of said parallel walls being rigidly connected to said housing for fixed support thereby and provided with transversely aligned notches in the forward edges thereof opening outwardly relative to said one side respectively to receive said projecting ends of said shaft at the upper discharge end of said elevator unit to support said unit for limited adjustable pivotal movement of the same to dispose it at a desired angle relative to said inlet opening, removable retaining means extending transversely across the open outer ends of said shaft-receiving notches in said opposed parallel walls of said inlet opening means to close the same and interengageable with said projecting ends of said shaft of said upper discharge end of said elevator unit received therein to retain said discharge end of said elevator unit operatively secured relative to said inlet opening of said housing, brace means extending outwardly from said housing and engaging said elevator frame in spaced relationship below the upper delivery end thereof, a drive gear connected to one of the outer ends of said shaft adjacent the delivery end of said elevator frame, and powered drive means on said processing machine positioned adjacent said inlet opening and interengageable by said drive gear on said elevator unit when the projecting ends of the shaft at the delivery end of said elevator frame are received and retained within said notches in said inlet means of said processing machine by said retaining means as aforesaid, thereby to effect connection of said elevator unit to said processing machine and establish connection of said flexible elevator means to the drive means of said processing machine for operation thereby.

2. The corn processing machine and elevator unit according to claim 1 in which said drive means on said processing machine comprises a sprocket chain extending around a plurality of sprocket gears and arranged to be driven by power supplied to said processing machine, and said drive gear on said elevator frame comprising a sprocket gear positioned to engage a course of said sprocket chain on said processing machine when said elevator unit is connected to said housing of said processing machine for operation with respect to the inlet means of said housing.

3. The corn processing machine and elevator according to claim 1 in which said opposed side walls of said inlet opening means are provided with clevis-like members respectively adjacent said outwardly opening notches in said side walls of said inlet means, said bearing structures having projecting ends thereon and said clevis-like members being shaped to receive said projecting ends on said bearing structures for said shaft adjacent the delivery end of said elevator, and said removable retaining members extending transversely across the open ends of said clevis-like members to retain said bearing structure extensions operatively therein.

4. The corn processing machine and elevator therefor according to claim 1 in which the opposite sides of said elevator frame comprise sides of a chute arrangement and the uppermost longitudinal edges of said sides are rounded and project outwardly from the opposite outer surfaces of said sides, and said one side wall of said housing of said processing machine having hanger bracket means thereon shaped complementarily to one side of said elevator frame and said rounded and outwardly projecting flange thereon and said bracket means being arranged to receive the same when said elevator unit is disposed in inoperative position along one side of said housing and is supported upon said hanger bracket, and additional locking means on said elevator frame engageable with the support means on said corn processing machine adjacent said inlet means to secure said elevator unit firmly in engagement with said hanger bracket means as aforesaid.

References Cited

UNITED STATES PATENTS

| | | | |
|---|---|---|---|
| 345,479 | 7/1886 | Bradley | 198—123 |
| 1,826,893 | 10/1931 | Larsen. | |
| 2,028,227 | 1/1936 | Lewis | 214—83.26 |
| 2,620,916 | 12/1952 | Hoffstetter | 214—83.26 |

EVON C. BLUNK, *Primary Examiner.*

RICHARD E. AEGERTER, *Examiner.*